US010885751B2

(12) United States Patent
Hazard et al.

(10) Patent No.: US 10,885,751 B2
(45) Date of Patent: Jan. 5, 2021

(54) ENHANCED AUTOMATED TELLER MACHINE, SYSTEM AND METHOD FOR SECURELY ENABLING A FINANCIAL TRANSACTION AT THE AUTOMATED TELLER MACHINE

(71) Applicant: Klear Technologies, Inc., Las Vegas, NV (US)

(72) Inventors: Scott David Hazard, Orinda, CA (US); Giancarlo Enrico Del Vecchio, San Diego, CA (US); Kenneth Chad Venables, Cape Town (ZA)

(73) Assignee: Klear Technologies, Inc., Las Vegas, NV (US)

( * ) Notice: Subject to any disclaimer, the term of this patent is extended or adjusted under 35 U.S.C. 154(b) by 0 days.

(21) Appl. No.: 16/155,685

(22) Filed: Oct. 9, 2018

(65) Prior Publication Data
US 2019/0108731 A1 Apr. 11, 2019

Related U.S. Application Data

(60) Provisional application No. 62/569,876, filed on Oct. 9, 2017.

(51) Int. Cl.
*G07F 19/00* (2006.01)
*G06Q 20/38* (2012.01)
(Continued)

(52) U.S. Cl.
CPC ....... *G07F 19/206* (2013.01); *G06Q 20/1085* (2013.01); *G06Q 20/3226* (2013.01);
(Continued)

(58) Field of Classification Search
CPC ... G07F 19/206; G07F 19/20; G06Q 20/1085; G06Q 20/3226; G06Q 20/3823; G06Q 20/40145; G06Q 20/4097
See application file for complete search history.

(56) References Cited

U.S. PATENT DOCUMENTS 5,592,560 A * 1/1997 Deaton ................ G06Q 20/042
235/375
7,376,580 B1 * 5/2008 Walker ............... G06Q 10/0637
705/14.36
(Continued)

OTHER PUBLICATIONS

International Search Report and Written Opinion dated Jan. 7, 2019 in corresponding International Application No. PCT/US2018/055069.

*Primary Examiner* — Daniel I Walsh
(74) *Attorney, Agent, or Firm* — Stroock & Stroock & Lavan LLP

(57) ABSTRACT

An enhanced automated teller machine (ATM), system and method for securely authenticating and enabling a financial transaction at the ATM. The method includes receiving at a central computer system, planned transaction data representing a future financial transaction. The central computer system generates first and second verification information, sends electronic data including the first verification information to the ATM, and sends electronic data including the second verification information to a user device. The central computer system receives multiple sets of electronic data from a user device and multiple sets of electronic data from the ATM. Multiple comparisons of certain sets of the electronic data from the ATM to certain sets of the electronic data from the user device are conducted at the central computer system. If the comparisons result in positive verifications, the central computer system sends electronic data including instructions for the ATM to execute the planned financial transaction.

15 Claims, 4 Drawing Sheets

(51) Int. Cl.
*G06Q 20/40* (2012.01)
*G06Q 20/10* (2012.01)
*G06Q 20/32* (2012.01)

(52) U.S. Cl.
CPC ..... *G06Q 20/3823* (2013.01); *G06Q 20/4097* (2013.01); *G06Q 20/40145* (2013.01)

(56) References Cited

U.S. PATENT DOCUMENTS

| | | | | |
|---|---|---|---|---|
| 8,341,077 | B1* | 12/2012 | Nichols | G08B 13/08 |
| | | | | 705/39 |
| 8,544,217 | B2 | 10/2013 | Andreini et al. | |
| 9,004,352 | B1* | 4/2015 | Graef | G07D 11/0096 |
| | | | | 235/379 |
| D747,002 | S | 1/2016 | Siegel et al. | |
| 9,640,009 | B1* | 5/2017 | Sears | G07G 5/00 |
| 9,836,727 | B1* | 12/2017 | Brennan | G06Q 20/20 |
| D850,054 | S* | 5/2019 | Del Vecchio | D99/28 |
| 10,453,041 | B1* | 10/2019 | Walker | G07F 19/206 |
| 2002/0042743 | A1* | 4/2002 | Ortiz | G06Q 30/0207 |
| | | | | 705/14.38 |
| 2003/0074317 | A1* | 4/2003 | Hofi | G06Q 20/40 |
| | | | | 705/44 |
| 2005/0125350 | A1* | 6/2005 | Tidwell | G06Q 20/403 |
| | | | | 705/42 |
| 2006/0122881 | A1* | 6/2006 | Walker | G06Q 30/0247 |
| | | | | 705/14.13 |
| 2006/0131395 | A1* | 6/2006 | Potts | G07F 17/3237 |
| | | | | 235/380 |
| 2008/0265019 | A1* | 10/2008 | Artino | G07F 19/202 |
| | | | | 235/379 |
| 2009/0265272 | A1* | 10/2009 | Dill | G06Q 20/10 |
| | | | | 705/41 |
| 2011/0258090 | A1* | 10/2011 | Bosch | G06Q 40/02 |
| | | | | 705/30 |
| 2011/0295722 | A1* | 12/2011 | Reisman | G06Q 30/0641 |
| | | | | 705/27.1 |
| 2013/0140358 | A1* | 6/2013 | Graef | G07D 11/0096 |
| | | | | 235/379 |
| 2013/0146657 | A1* | 6/2013 | Graef | G07D 11/14 |
| | | | | 235/379 |
| 2013/0175338 | A1* | 7/2013 | Block | G07F 19/205 |
| | | | | 235/379 |
| 2013/0232064 | A1* | 9/2013 | Bosch | G07F 19/20 |
| | | | | 705/43 |
| 2014/0006149 | A1* | 1/2014 | Grigg | G06Q 20/387 |
| | | | | 705/14.51 |
| 2014/0156527 | A1* | 6/2014 | Grigg | G06Q 20/3221 |
| | | | | 705/44 |
| 2014/0166745 | A1* | 6/2014 | Graef | G07F 19/202 |
| | | | | 235/379 |
| 2014/0180924 | A1* | 6/2014 | Ozvat | G06Q 20/20 |
| | | | | 705/44 |
| 2016/0110529 | A1* | 4/2016 | Mathew | G06F 21/32 |
| | | | | 726/7 |
| 2016/0275760 | A1* | 9/2016 | Block | G06Q 20/3223 |
| 2018/0108008 | A1* | 4/2018 | Chumbley | G06Q 20/3674 |
| 2019/0108731 | A1* | 4/2019 | Hazard | G06Q 20/40145 |

* cited by examiner

ENHANCED AUTOMATED TELLER MACHINE, SYSTEM AND METHOD FOR SECURELY ENABLING A FINANCIAL TRANSACTION AT THE AUTOMATED TELLER MACHINE

CROSS REFERENCE TO RELATED APPLICATIONS

The present application claims priority to and the benefit of the filing date of U.S. Provisional No. 62/569,876, filed Oct. 9, 2017, which application is incorporated herein fully by this reference.

FIELD OF THE INVENTION

The embodiments of the present invention relate to an enhanced automated teller machine ("ATM"), system and method for more securely verifying user identity and authenticating a financial transaction occurring at an ATM.

BACKGROUND OF THE INVENTION

Automated teller machines have been around for many decades and provide a user the ability to carry out bank related transactions without the need for a human teller. Over the years, certain advances have been made to ATMs, however the overall experience of using an ATM has remained stagnant. While there have been numerous modifications to the designs of ATMs, there still exist many security and other related deficiencies in the overall manner in which an ATM user interacts with an ATM that have yet to be rectified. For example, in the traditional ATM, a user utilizes an ATM card and four digit passcode. This manner of authenticating a user is still in existence from the early days of ATMs and ATM security has not incorporated many new security related technologies.

In light of the deficiencies of the prior art systems, there is a need for an improved ATM that is more secure and versatile than the existing ATMs and that improves a user's overall experience using an ATM. In view of the above discussion and the shortcomings in the prior art the invention seeks to improve a user's experience using an ATM and enables the user to manage its transactions in a secure and efficient manner, seeks to enhance security of transactions and provide increased resistance to fraudulent transactions and losses.

SUMMARY OF THE INVENTION

Embodiments of the present invention include a method for securely authenticating and enabling a financial transaction at an automated teller machine, in which a central computer system receives, from a software platform, planned transaction data representing a future financial transaction. The planned transaction data includes transaction identification data. The central computer system then receives a first set of electronic data from the automated teller machine, the first set of electronic data representing a request for at least first verification information. After receiving the first set of electronic data, the central computer system generates first verification information. The central computer system sends a second set of electronic data to the automated teller machine, the second set of electronic data including at least the first verification information. The central computer system receives a third set of electronic data from a user device. The central computer system conducts a first comparison by comparing at least a portion of the third set of electronic data to at least a portion of the second set of electronic data. If the first comparison results in a positive verification, the central computer system sends a fourth set of electronic data to the user device, the fourth set of electronic data including at least second verification information. The central computer system receives a fifth set of electronic data from the automated teller machine, and the central computer system conducts a second comparison by comparing at least a portion of the fifth set of electronic data to at least a portion of the fourth set of electronic data. If the second comparison results in a positive verification, the central computer system sends a sixth set of electronic data to the automated teller machine, the sixth set of electronic data including instructions for the automated teller machine to execute the planned financial transaction. Then the automated teller machine executes the planned financial transaction. In some embodiments the first verification information is unique information that is not repeated by the central computer system during later financial transactions. In certain embodiments the second verification information is generated by the central computer system after determining the second comparison resulted in a positive confirmation. In one such embodiment, the second verification information is unique information that is not repeated by the central computer system during later financial transactions. Additionally, in some embodiments the first verification information is visual information, audible information, electronic data, or any combination thereof.

Other embodiments of the present invention include an automated teller machine (ATM) having an exterior case surrounding interior components of the ATM. The majority of the exterior case is composed of substantially transparent material. The ATM also has an accessible surface of the exterior case. The ATM further includes a user input device located on the accessible surface, the user input device having user input areas. Additionally, the ATM includes an internal subassembly containing one or more currency containers, and one or more slot providing access through the exterior case. The substantially transparent material is composed of multiple layers, with each of the multiple layers being one or more of laminated glass, fortified glass, polycarbonate, silicone, polymer and polyester film. In some embodiments, the exterior case encompasses a first compartment and a second compartment, with a separator plate between the first compartment and second compartment. In such embodiments, the second compartment contains the internal subassembly, and the first compartment contains a printer. Additionally, in some embodiments one or more of the multiple layers is composed of a polymer inner-layer. Other embodiments of the ATM also include one or more sensors configured to determine one or more physical attributes of currency.

BRIEF DESCRIPTION OF THE DRAWINGS

The foregoing summary, as well as the following detailed description of preferred embodiments of the application, will be better understood when read in conjunction with the appended drawings wherein like reference numerals refer to like components. For the purposes of illustrating the system and method of the present application, there are shown in the drawings various embodiments. It should be understood, that the application is not limited to the precise arrangement, structures, features, embodiments, aspects, and systems shown, and the arrangements, structures, features, embodiments, aspects and systems shown may be used singularly or in any combination with other arrangements, structures, features, embodiments, aspects or systems.

The drawings are not drawn to scale and are not in any way intended to limit the scope of this invention, but merely to clarify a single illustrated embodiment of the invention. In the drawings.

DETAILED DESCRIPTION OF CERTAIN EMBODIMENTS OF THE INVENTION

In accordance with various embodiments of the invention, and as shown herein, various systems and methods are disclosed which enhance a user's experience using an ATM and enable secure and efficient processing of transactions.

In general, an ATM according to one embodiment of the present invention permits a user to utilize an ATM to withdraw money or process other banking transactions. These transactions may include the traditional tasks that an ATM is utilized for (e.g., withdrawals, deposits) or other transactions such as alternative currency, digital currency, or other form of currency instantiation, whether currently existing or future-developed, and may include commodity transaction as well as the paying or issuing of bills or any potential transaction involving receiving payments. The ATM may also allow a user to interact with the ATM from their personal device (e.g., computer, phone, tablet, wearable device). The ATM may include one or more processors, one or more microcontrollers, one or more displays, one or more printers, one or more optical components such as cameras, one or more audio components such as speakers, microphones or both, one or more data storage components, one or more wireless communication components, one or more wireless location-tracking components, one or more security components such as, but not limited to, a finger print reader, iris scanning software, or facial recognition software. The processor may be operatively coupled to one or more microcontrollers for dispensing items (e.g, currency, receipts) to a user. The wireless communication components may include a cellular modem, a radio-frequency transducer, a Bluetooth modem, any of which may be operatively coupled to a processor. The cellular modem may include an antenna and may include a personal communication service modem. The radio-frequency transducer may be a bidirectional transducer, and may be configured for short range communication. The wireless location tracking components may include a wireless modem and may include a radiolocation receiver configured to receive electromagnetic frequency waves or signals or any other form of intelligible input from appropriate sources, for example fixed radiolocation towers or global positioning system satellites. The radiolocation receiver may be operatively coupled to a processor, and the wireless modem may be operatively coupled to a processor.

Figure 1:
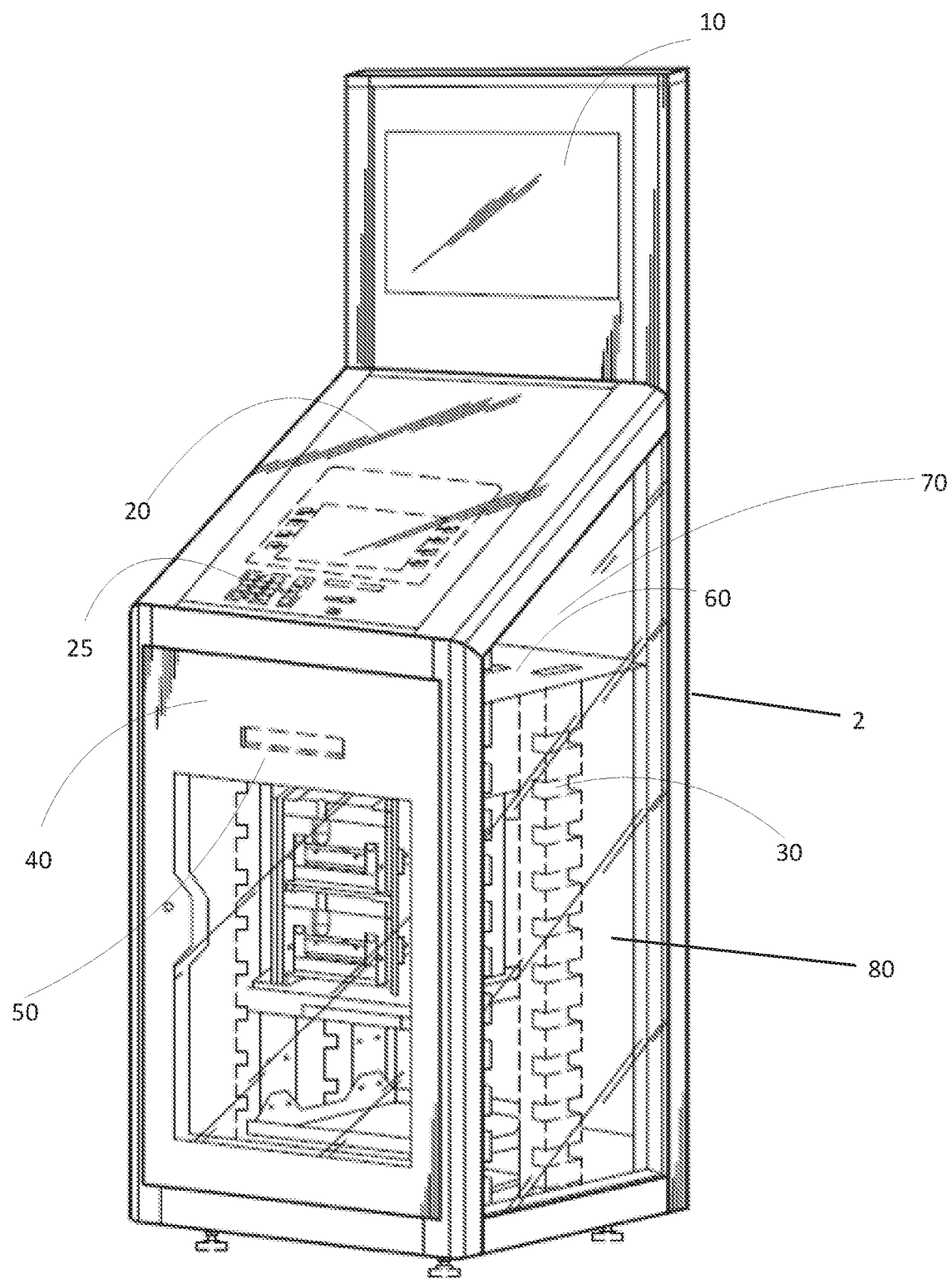
FIG. 1 depicts an embodiment of an Automated Teller Machine.
Figure 4:
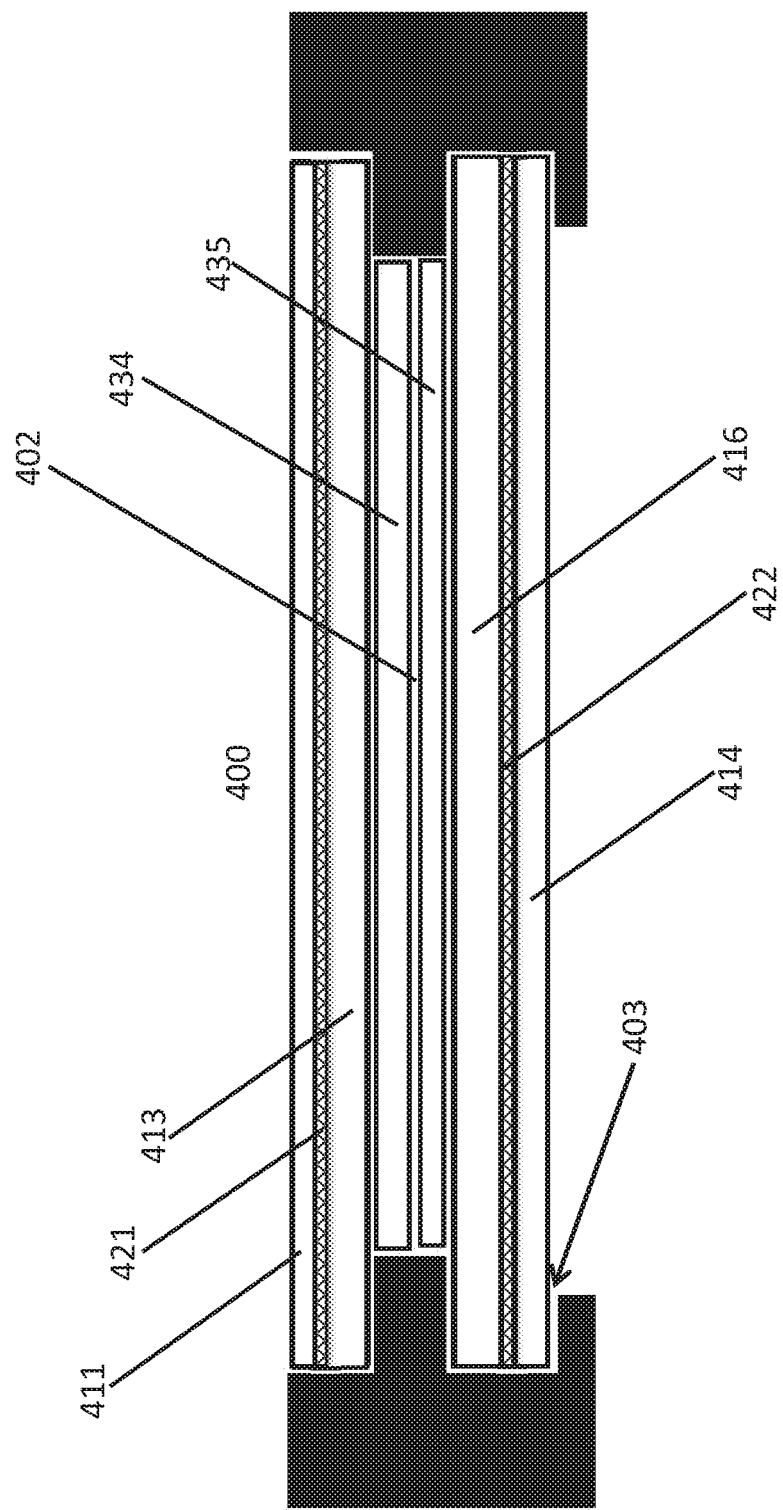
FIG. 4 is a cross sectional view of a side of an exterior case of an automated teller machine in accordance with an exemplary embodiment.

As seen in FIG. 1, ATM 100 preferably includes an exterior case 2 with an accessible surface 20 that includes a user input device 25, for example a user may utilize a keypad to interact with the ATM. The exterior case may have multiple sides and a majority of the exterior case may be composed of see-through material, for example substantially transparent, translucent, or opaque material. In one embodiment, as shown in FIG. 4, the see-through material 400 is composed of multiple layers 411, 421, 413, 434, 435, 414, 422, 416. Such layers may be composed of glass, laminated glass, fortified glass, polycarbonate, silicone, polyester film, foil of various compositions, polymer, inner-layers of various compositions, or other transparent, translucent, or opaque elements. The accessible surface may be a slanted bezel surface. The user input device includes user input areas, for example buttons, keys, or preset areas intended for user interaction. The user input device may be a touch sensitive panel or display. The area underneath the accessible surface may be composed of a transparent, translucent, or opaque material (e.g., glass, polycarbonate, composite) and there is a display 10, which may be an LCD display, above the slanted bezel 20. Within the exterior case there may be an inner subassembly structure 30 which will be discussed in more detail below. The ATM may also include a door 40, and a slot 50 capable of dispensing or accepting materials, or both, which may be located on the door 40. The door may be a symmetrically mountable door capable of being mounted to open in various directions, for example a clockwise rotation through a horizontal plane, a counter-clockwise rotation through a horizontal plane, a clockwise rotation through a vertical plane, a counter-clockwise rotation through a vertical plane, or other opening motion. In certain embodiments, the components of the ATM are compliant with the American with Disabilities Act ("ADA") at the time. For example, the accessible surface may be a slanted surface at an angle of thirty degrees between the slanted surface and a plane parallel to the ground, each user input area of the user input device and each slot may be positioned and located complaint with the ADA, for example at a certain vertical distance from the ground, and the ATM may include an alternative communication component such as an audio component, for example a speaker or audio jack.

The display 10 may improve over time as the quality of video projection upon glass surfaces improves and the present invention is intended to cover all projection technology heretofore existing or developed in the future. The display 10 also may utilize augmented reality simulations as powered through a user's personal device which may be directly connected to the ATM or display, or both, through any appropriate means such as RF communication, optics, or any signal-capable method or application, such as a mobile computer application. Generally the display 10 presents advertisements or other information messages when the ATM is not being used and displays supportive information to the user that is relevant to their transaction or account when the ATM is being used. In one embodiment, display 10 incorporates one or more customer-facing optical components, for example cameras, sensors, or other devices, which may be used to verify the user's identity as part of an authentication process that is discussed in more detail below. The optical components may be located on or near display 10, or on or near the bezel 20, or both. The use of multiple optical components from differing angles may be used to provide additional security and potential views of the user that may be used to verify the user's identity. Additionally, in one embodiment, the optical components may provide a snapshot, or other form of data, to accompany each transaction in order to enhance security and prevent fraud, money laundering or other illegal activities. The optical component may also be used for facial recognition and targeted advertisements that may be addressed to specific users for any reason.

In one embodiment, display 10 may be remotely managed by a manager that is connected to ATM 100, when given permission by a software platform or computer components within the ATM, or both, and will only display content that is permitted by the ecosystem of the machine (i.e., closed loop one sided). Potentially an advertisement that is displayed while a transaction is processing may be displayed in one capacity on the user device, and another matching or complementary advertisement may be displayed interactively or through augmented reality on the display. As will be appreciated by one of ordinary skill in the art, the display may use Organic Light Emitting Diodes ("OLED") or any other lighting or display technologies. The display preferably is embedded in between fortified glass on either side so that both sides may be displaying different content, potentially "sliding" from one screen to the other, front to back and around in 360 degrees.

Audio components, for example speakers, may also be placed on or in the vicinity of display 10 for sending and receiving of unique audio verification information, such as QR tokens, to verify transactions between the ATM and a user device. Speakers may also be used in conjunction with video content from display 10, or other appropriate source, and other advertising opportunities. In one embodiment the audio components include a microphone that may be embedded into the display to potentially verify audio, such as voice, for additional recognition and fraud prevention. When user has a potential issue with an ATM, the user may also contact or chat with technical support through the microphone and hear responses through the speakers. In one embodiment, the ATM includes one or more wireless communication component, for example an antennae (e.g., Bluetooth, Wi-Fi, satellite, solar panel), which may be house in the display 10, such as embedded in or on top of the glass. Such an antennae may also be capable of providing power. As will be appreciated the display may be angled or curved to attain a desired look or function. In one embodiment, an intelligent lighting system may be integrated with an alarm or sensors to monitor motion, in the general vicinity of the ATM for safety purposes. In one embodiment the lighting may be designed to pass through separator plate 60 or may be paired with other lighting to enhance the appearance.

The ATM also preferably has a user input device, such as a keypad 25, for the user to interact. In one embodiment, keypad 25 may be backlit by multi colored LEDs that are built into the ATM or alternatively may be backlit, for example one stable color, by any appropriate lighting technology. For example the keypad may change certain colors depending on whether or not appropriate/correct responses are entered/received. Alternatively, the ATM itself or a portion thereof may turn certain colors if a breach or other timely or noteworthy event is detected. Additionally, biometric security devices, such as hand or finger scanners, may be built in to the ATM. Additionally beacon scanners may be utilized in one embodiment to scan multiple items.

ATM 100 preferably includes Bluetooth antennas and may also include multiple antennas which may enable authentication as well as wireless internet connectivity or the ability to connect a user's device for use during authentication of transactions or at any other appropriate time. These additional antennas may also provide increased bandwidth and speed. Computing devices may also be used to verify any category of transaction and may use the computer's individual CPU power and data capacity to verify validity of transactions on any appropriate banking network, data network, or data access technology.

The ATM may be equipped with a MAC address scanner so that the ATM may know to look for certain MAC addresses to notify authorities of potential fraudulent access, or may be used for other purposes, such as analyzing foot traffic, number of users nearby, or any other parameter of interest.

In an embodiment, ATM 100 includes an inner subassembly 30. Inner subassembly 30 houses one or more currency container, such as cassettes, and other components, such as dispensers, needed for operation of the ATM. The ATM, or Inner subassembly 30, may also include support components, such as legs, that are sufficient for supporting the ATM, for example over 250 pounds of weight. Inner subassembly 30 may be of various sizes, composition, and shape, configured to hold various currency containers for the ATM. The ATM, or Inner subassembly 30, may also include a separator plate 60 to separate the inner subassembly from bezel 20. In one embodiment, the inner subassembly 30 may be modified, such as expanded, to accommodate currently available components, allowing for the addition of a cash recycler, or cash receiver, or for accepting checks or any type of bills, currency or financial instrument, in addition to coins, and may include a coin-receiving and/or dispensing hopper. The inner subassembly 30 may be configured in a modular manner so that the subassembly may accept dispensers and components from different manufacturers having different dimensions and requirements. Inner subassembly 30 is preferably centered, although it may be moved within the ATM as required. ATM 100 also includes a door 40 on the front side of the exterior which may preferably be changed and swapped out or modified for the allowing of a subassembly structure with modified or altered dimensions. Inner subassembly 30 also may have one or more apertures or notches to allow for the accommodation of necessary cables to power one or more devices, computers, dispensers, components, power, electrical, and other antennas or cables. Inner subassembly 30 also may include multiple areas to mount components of different heights to be sitting on a slideable tray that enhances the insertion and removal of components and objects.

As will be appreciated by one of ordinary skill in the art, inner subassembly 30 may also be built in any orientation to hide or expose the cables as preferred for design or functionality purposes.

In embodiments of the ATM, separate compartments or areas may be employed to contain currency containers, printers, or other forms of equipment, and one or more separating components may be utilized. In one embodiment a separator plate 60 is placed within the exterior case between a first compartment 70 and a second compartment 80. The separator plate 60 is may be hermetically sealed against the glass to prevent thieves from breaking into the first compartment 70 that may be utilized to hold a printer. This is an added security measure so that even if a thief manages to break into the first compartment 70 the thief will not be able to reach below into the second compartment, which contains the subassembly and currency cassettes. Separator plate 60 is may be installed from the door and may be located so that the subassembly structure may be oriented in an advantageous position to support desired function. Separator plate 60 may be designed to enhance security and resist intrusion. Separator plate 60 may also have one or more apertures or notches for the accommodation of cables, wires or antennas.

In one embodiment a currency dispenser of the ATM may be used in conjunction with an ultraviolet lighting mechanism so that the money may be sanitized as it is being dispensed. Currency dispenser, or internal passages of the ATM, may include measuring components, such as a sensor or sensors, for detecting or assuring currency mass, thickness, appearance, or other physical properties or attributes, such as optical sensors, weight sensors or dimension sensors. The sensors may collect data that may be used to verify that currency is correctly loaded and dispensed. In one embodiment the currency container and currency dispenser may include a Bluetooth antenna or NFC antenna to verify the identity of the component, and/or communicate with other components. The ATM may utilize smart components, for example a currency container or a currency dispenser, which exhibits self-awareness regarding function, position or identity. These smart components may be capable of, but not limited to, the ability to load currency from an exterior of the ATM or other position. The currency container and currency dispenser may be composed of polycarbonate or other transparent, translucent, or opaque materials. The ATM may include components and functions for bill counting, tamper resistance, dye-stain detection, or other enhanced security feature.

In one embodiment the ATM may also include battery backups or solar panels to enable the ATM to operate in the event of a power outage or other interruption. These panels may be built into the different portions of the ATM (e.g., bezel, tower etc.).

Battery backups may also include pinging or other technology to send out a distress signal that may be used in an emergency or otherwise to alert authorities to any potential issues. The ATM's audio components, optical components and other features may also be activated to assist in an emergency.

Figure 3:
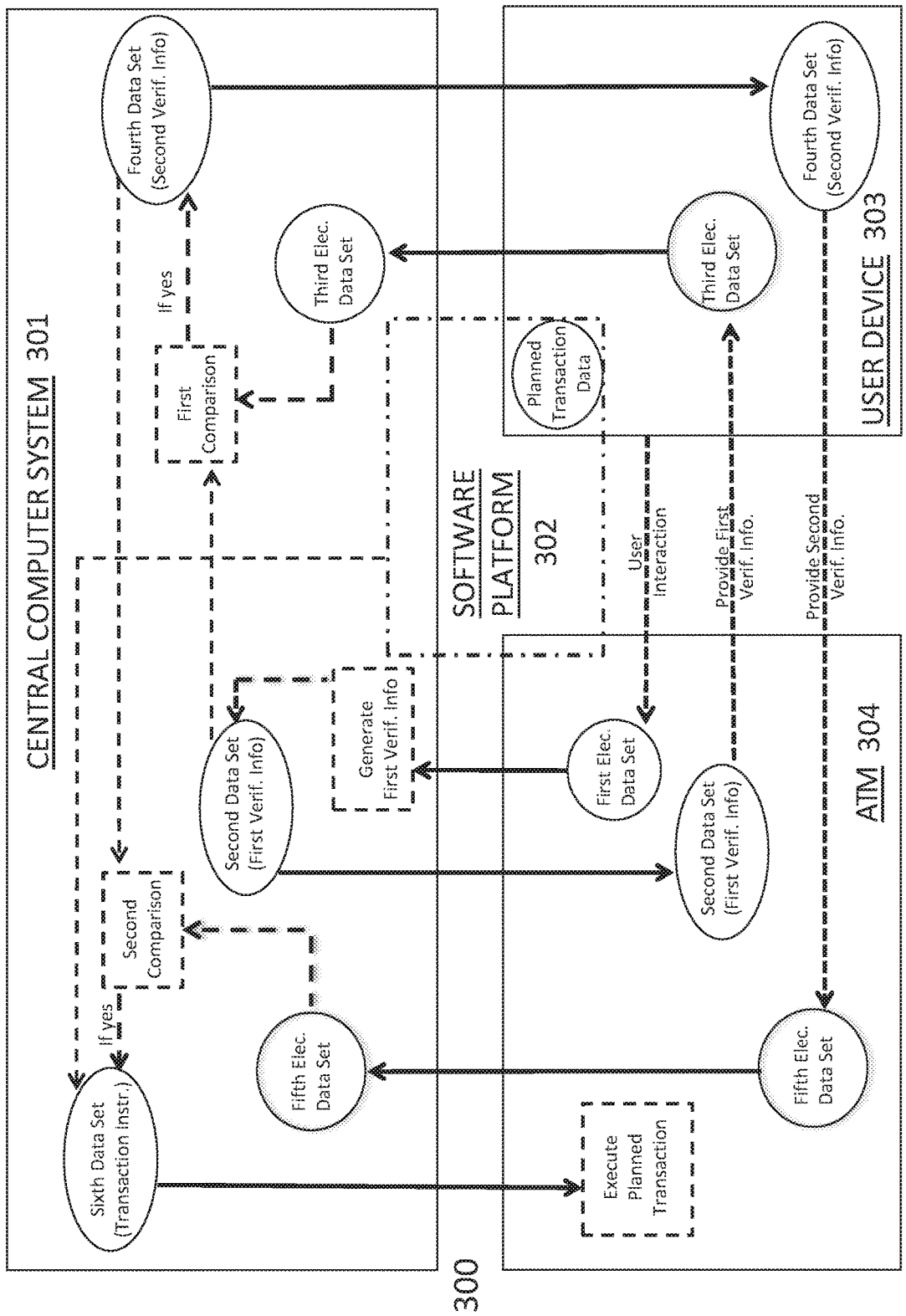
FIG. 3 is a diagram of a system for securely authenticating and enabling a financial transaction at an automated teller machine in accordance with an exemplary embodiment.

In one embodiment the ATM is utilized as part of a system, as shown in FIG. 3, for securely authenticating financial transactions conducted at the ATM. The system, through progressive layers of interaction, builds certainty as to the confirmation of the user identity and confirmation of the transaction, rapidly but through definitive transactional steps, thereby providing enhanced security of transactions with increased resistance against fraud and loss over conventional ATM systems. One embodiment of the authentication system 300 includes a central computer system 301, a software platform 302, a user device 303, and an ATM 304. The central computer system may include a server, and may include other computer components such as data storage devices, processors, receivers, transmitters, power supply components, power backup components, and internet connection components. The software platform may be a mobile banking application, a web banking application, an internet-accessed banking platform, or a banking software application stored on one or more internet connected device, for example computer readable and executable instructions stored on one or more of a user device, the ATM, a computer system, and a server. The user device may be a mobile device, for example a smart cellular phone, or may be a personal computer such as desktop or laptop, a tablet, or other device capable of sending and receiving data from the central computer system, and/or sending and receiving data from the ATM. The user device may include a processor, a display, one or more optical component, such as a camera or sensor, a data storage component, wireless communication components, wireless location tracking components, a security component such as, but not limited to, a finger print reader, iris scanning software, or facial recognition software.

The wireless communication components may include a cellular modem, a radio-frequency transducer, or a Bluetooth modem, any of which may be operatively coupled to a processor. The cellular modem may include an antenna and may include a personal communication service modem. The radio-frequency transducer may be a bidirectional transducer, and may be configured for short range communication. The wireless location tracking components may include a wireless modem and may include a radiolocation receiver configured to receive electromagnetic frequency waves or signals from fixed radiolocation towers or global positioning system satellites. The radiolocation receiver may be operatively coupled to a processor, and the wireless modem may be operatively coupled to a processor.

The user device may be a mobile device. The user device is capable of sending and receiving data from the central computer system, and may be capable of sending and receiving data from the ATM. The ATM is capable of sending and receiving data from the central computer system, and may be capable of sending and receiving data from user devices. The central computer system may be capable of sending and receiving data from user devices, as well as sending and receiving data from ATMs. The central computer system may also be capable of storing data, generating unique data packets, such as QR codes, passcodes or passwords, carrying out comparisons of data. In some embodiments, the ATM may also be capable of storing data, or carrying out comparisons of data.

Figure 2:
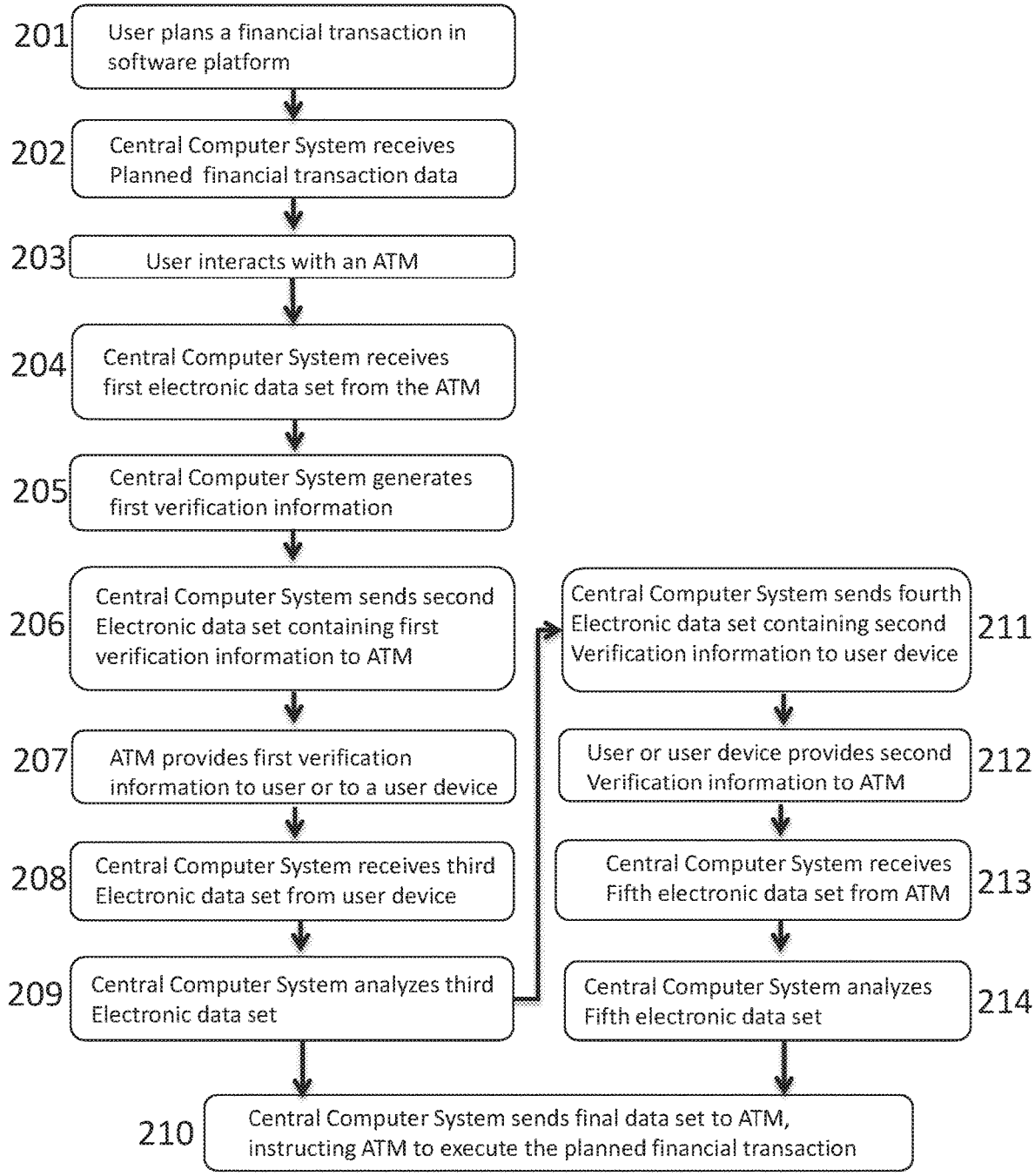
FIG. 2 is a flow chart of a method for securely authenticating and enabling a financial transaction at an automated teller machine in accordance with an exemplary embodiment.

In one embodiment the system is used to authenticate and carry out financial transactions at ATMs, as shown in FIG. 2. The user device preferably obtains a device portion of the software platform, such as a mobile banking application, by downloading the mobile application to the user device. The user wirelessly connects the user device to the central computer system by logging into the mobile application, using one or more security measure, such as but not limited to a password, a passcode, a fingerprint, or facial recognition. Once accessed, the mobile application may instruct the components of the user device to acquire the approximate location of the user device (e.g., using GPS technology), and based on the acquired location data generate a map or other graphical representation of the closest ATMs on the display of the mobile application. Optionally, the user may input a street address into the mobile application, and based on the street address the mobile application populates the closest ATMs on the display of the mobile application. In some embodiments the user may select a populated ATM for conducting a future financial transaction, while in some embodiments selection of an ATM is not needed prior to planning a future financial transaction.

The user, within the software platform, then plans a future financial transaction to occur at an ATM, for example a cash withdrawal, in step 201. The mobile application, by way of the user device components, sends the planned financial transaction to the central computer system in step 202. The software platform preferably generates transaction identification information specific to the planned financial transaction, for example data that associates the planned transaction with the user, and that may associate the planned transaction with the user device or the user's devices, and/or a selected ATM or ATMs.

Depending on the user device's technological capabilities (e.g., the technical capabilities of their mobile device/computer), in certain embodiments, the user preferably carries out the following steps. The user may locate and identify an ATM that is part of the system by using the mobile application on their device. After planning the transaction, the user may approach an ATM that is part of the system and in step 203 interacts with the ATM, for example by pushing a pre-determined button or series of buttons on the display, which may present prompts inviting them to complete a pre-planned ATM withdrawal or ATM transaction. In other embodiments, the user interacts with the ATM via the mobile application on their device, for example by sending data or information, either manually or automatically, from the user device to the ATM via wireless communication, visual communication, or audible communication when within a preset distance of the ATM, or by placing the user device in contact with a portion of the ATM.

After having interacted with the ATM, a first piece of verification information, for example a QR Code, password, or passcode, is preferably provided to the user. The ATM requests the first piece of verification information from the central computer system, after the user has interacted with the ATM. Preferably, the ATM sends the request to the central computer system in the form of a first set of electronic data.

The central computer system receives the first set of electronic data in step 204, and then in step 205 the central computer system generates the first verification information. The first verification information is preferably unique and not repeated again by the central computer system for any future transactions. The central computer system then in step 206 sends the unique first verification information to the ATM, preferably within a second electronic data set, and in step 207 the ATM then provides the first verification information to the user or to a user device. Once the second electronic data set is received and the first verification information is made available to the user, for example by visual display, audio emittance, or wireless electronic transmission, the user may then refer to the software application, preferably populated with the user's already planned transaction, on the user device and receive the first verification information from the ATM.

In one embodiment, the first verification information may be visual, such as a visual QR code, and may be utilized if the user has a camera on the user device. For example, the user may scan the QR code by snapping a photo through its camera. In some embodiments additional verification data is utilized. For example, the central computer system may include in the second electronic data set a password or passcode that the ATM receives and provides to the user at the same time, or instead of, the first verification information. Immediately following the scanning of the QR code, the mobile application may be configured to prompt the user to submit user-generated verification data, for example a real-time user-generated audio file of the user's voice, a real-time user-generated image of the user's face. For example, upon collecting the first verification information, the mobile application may cause the user device, such as a mobile device or computer, to activate the front-facing camera of the user device for the user to take a real-time user-generated verification photograph, such as by inviting the user to pose and take a photo of the user's face, or, may be asked to make some pre-defined gestures with their face. Such movements may be used with either a facial recognition software within the application or separately installed on the user device, or through liveness detection or other similar software to verify the user's identity. In other embodiments the first verification information is a passcode or password, which is provided to the user by the ATM, for example presented on the display of the ATM. In one embodiment the first verification information is an audio QR code, which is emitted from the ATM's speakers and received by the user device's audio receiver. The first verification information may also be electronically transmitted to the user's device wirelessly from the ATM's wireless transmitter or other wireless communication component.

The first verification information provides added security over the existing ATM transaction verification processes because such processes utilize passcodes, for example four digit codes, that are static and exist prior to the user planning a transaction or approaching the ATM. Such existing processes are highly susceptible to fraud, either through computer hacking, theft or other methods of misappropriation. The first verification information does not exist prior to the user interacting with the ATM, is specific to a single transaction, and is not repeated, such that it is significantly less susceptible to misappropriation.

The collected first verification information is then sent in step 208 from the user's device via the mobile application to the central computer system, for verification. The collected first verification information may be sent to the server along with additional verification information, such as, for example the user-generated verification data discussed above, GPS coordinates of the user device, biometric information collected via the user device including but not limited to fingerprint and iris scans, as well as the transaction identification data specific to the pre-planned transaction. The collected first verification information is preferably sent to the central computer system within a third electronic data set. The central computer system analyzes the third electronic data set in step 209. In one embodiment the central computer system conducts a first comparison by comparing at least a portion of the information contained in the third electronic data set that was received from the user device, for example the collected verification information, with at least a portion of the information the central computer system had sent to the ATM within the second electronic data set, for example the first verification information. The central computer system may also compare the additional verification information with information stored within the central computer system, such as user account information, including but not limited to stored facial recognition information, stored biometric information, or stored user device information, as well as transaction information, including but not limited ATM GPS information, or transaction identification information.

If the user does not have a camera, the user may utilize an alternative passcode, password or a token, alone or in combination with additional verification data, such as the GPS coordinate of the user device, to verify the identity of the user by sending the information to the central computer system.

If the first comparison results in a positive verification (i.e., the compared information matches), the central computer system may send in step 210 a final electronic data set to the ATM instructing the ATM to execute one or more actions representing the planned financial transaction. For example, once verified, the server may push a Yes or No notification or token to the ATM which is waiting for a verification token from the server. If the server responds with a Yes, the machine will dispense the total number of bills requested by the user in the pre-planned financial transaction. If the server responds with a No, the ATM may let the user know that something wrong occurred in the transaction and they were not verified or request that the user either try again or seek some other remediation (e.g., call a customer service number).

If the device being used by the user has a more limited capacity and the previously discussed methods of verification are not possible or preferable, the user may utilize text messaging or some other form of communication to verify its identity. This messaging may include any combination of user codes or other identifying information about the transaction. Once the identity is verified, the transaction is approved (e.g., the money is dispensed).

In another embodiment a wearable device may be used to set up a "quick withdrawal" button whereby double-tapping a certain combination of buttons may result in a certain pre-determined amount of money being dispensed. Wearable mobile devices may also be used in the authentication process as explained above as may be appreciated by one of ordinary skill in the art.

According to another embodiment of the present invention, an additional feature of ATM 100 is the ability to utilize a two way Bluetooth antenna or other communication enabling antenna to have the ATM communicate with the user's device, such as a mobile device, directly when the user device is within a certain range. For example, the user device may be illuminated or include another notification that the ATM is ready for their use and their soon to be initiated transaction has been preliminarily approved through the pairing of the devices. The security may be additionally enhanced through the user having logged into their own device using the device's verification mechanism (e.g., password, face identification, fingerprint). As the user approaches the ATM and is within a certain close proximity, the LCD may take a photo of the user's approach and standing or mobilizing themselves in whatever capacity to be in front of the ATM. This photograph may also optionally be used to verify the user's identity. In one embodiment, the user will be invited to utilize the user device, such as touching or tapping, when they approach within a certain distance of the antenna. The device will preferably harvest all the data received and combine that with the user's GPS to send to the server for verification. If the data verifies the authenticity of the transaction, the transaction is carried out (e.g., the money is dispensed).

As will be appreciated by one of ordinary skill in the art additional or fewer verification steps may be carried out depending on the technological capabilities of the user device and/or ATM. For example, in some embodiments, if the first comparison (i.e., comparing the third electronic data set to the second electronic data set) results in a positive verification, the central computer system sends a fourth electronic data set in step 211, which includes a second piece of verification information, to the user device. The user or user device, then in step 212 provides the second piece of verification information to the ATM. For example, the second piece of verification information may be a password or passcode which the user may view within the mobile application via the user device, and physically interact with the ATM to enter the second piece of verification information. In other embodiments, the second piece of verification information may be an image or visual QR code that is visually collected by an optical component of the ATM scanning the user device, or may be an audio QR code or sound or series of sounds emitted from the user device or verbally by the user, which is collected by the audio receiver of the ATM, or may be electronic data wireless transmitted from the user device to the wireless communication components of the ATM. In embodiments that utilize the user device to provide the second piece of verification information to the ATM, the user device may automatically provide at least a portion of the fourth electronic data set, for example the second verification information, to the ATM upon receiving it from the central computer system. The second piece of verification information may be generated by the central computer system after the central computer system determines the first comparison resulted in a positive verification. The second piece of verification information may be unique and not repeated by the computer system in future transactions.

Upon receiving the information or data from the user or user device, the ATM then in step 213 sends the collected information or data to the central computer system, for example as at least part of a fifth electronic data set. In some embodiments included within the fifth electronic data set is additional verification information, such as, but not limited to, real-time biometric information collected by the user device, facial recognition information collected by the user device, ATM captured verification information, transaction identification information, user device information collected by the user device, real-time user biometric information, and/or real-time GPS information collected by the user device. The ATM captured verification information may include real-time image information collected by an optical device of the ATM, real-time user-device information collected by a wireless communication component or scanning component of the ATM, real-time biometric information collected by a security component of the ATM, or GPS information collected by the ATM. The central computer system then in step 214 analyzes the fifth electronic data set. In one embodiment, the central computer system conducts a second comparison by comparing at least a portion of the fifth electronic data set to at least a portion of the fourth electronic data set. The second comparison may also compare the additional verification information contained within the fifth data set with information stored within the central computer system, such as user account information, including but not limited to stored facial recognition information, stored biometric information, or stored user device information, as well as transaction information, including but not limited ATM GPS information, or transaction identification information. If the second comparison results in a positive verification, for example both contain data representing the second verification information, the central computer system sends a final data set in step 210, such as a sixth electronic data set, to the ATM. The sixth electronic data set, for example the final electronic data set, including instructions for the ATM to execute one or more actions representing the planned financial transaction.

The second verification information provides even further added security over the existing ATM transaction verification processes because the second verification information is not available prior to the user's interaction with the ATM, is specific to a single transaction, and may be unique and not repeated by the system, such that it is significantly less susceptible to misappropriation than the static pin codes used by current ATM systems. Additionally, in some embodiments, one or more steps, or one or more combination of steps, may have a preset time limit, such that if the time limit expires for a step or combination of steps, the transaction is terminated, and the user must start the sequence over again by initiating the first interaction with the ATM. Such time limits provide added security and increase the difficulty of misappropriating the information required to execute the planned financial transaction. As shown above, the level of security and verification involved with the financial transaction authentication systems described in the present application is significantly more robust that existing ATM systems. In one embodiment, the user must log into a device, log into the software platform, plan the financial transaction, and provide the central processing system with the unique non-repeated first verification information that has been generated by the central processing system in real-time and provided to the ATM before the transaction will be completed. In some embodiments, the user must also select the ATM the transaction will be executed at prior to interacting with the ATM. In other embodiments, the computer system must also receive and verify additional verification information, such as, but not limited to, biometric information, facial recognition information, user-generated image information, ATM capture image information, transaction identification information, user device information, and/or gps information. In other embodiments, the computer system must also receive second verification information that has been provided by the central processing system to the user device and/or user, and then provided to the ATM. In further embodiments, the second verification information is also unique, non-repeated and generated by the central processing system in real-time. Accordingly, the financial transaction authentication systems discussed herein are significantly more secure and more resistant to fraud than current prior art ATM systems.

In one embodiment, a user device may be used in lieu of or in conjunction with the keypad device to minimize a user's contact with the ATM itself. A mobile application may also be used to set up a preferred color or lighting scheme for a specific user to be displayed when the user utilizes the ATM. Additionally different schedules may be set up on the user's calendar for specific greetings or messages on a certain day (e.g., It is Friday, would you like to withdraw X Dollars to pay John?).

In one embodiment, in order to ensure that the ATM is capable of being used by a user in a wheelchair, for example in compliance with American Disability Act ("ADA") requirements, there is a top functioning element between 40 and 55" more preferably 48" and a reach towards the bezel between 4 and 8" and most preferably 7". The ATM may also be lowered to address certain individuals with disabilities. Additionally or alternatively the near field communication ("NFC") or other antenna may be placed in a different position. Number keys may also be curved to the touch, corresponding alphabet on number, braille, and audio input or output placed near the keypad housing to be within ADA requirements. In one embodiment, there will be no need to touch the keypad at all and the transaction may be authorized and verified through the user's device.

The user device's mobile application may also include features where the application invites users to visit the retailer hosting the ATM (e.g., restaurant) or offers coupons or discounts related to the same. The application may also provide information to the user about saving data usage by connecting to the ATM's internet connection.

Moreover, the antenna may be used to stream content from the user device onto LCD 10, or to mirror the display of the users app so that they may make use of the entire LCD to have more space to view teller, transactional data, advertisement, or other materials.

Bluetooth technology may also be used to control music or lighting of the ATM or LCD (i.e., closed loop access) and the user may be able to download updated versions of the application, special authentication codes to verify accounts, renew accounts, or send special wire transfers or other special transactions that need the additional security and pairing that is enabled through the Bluetooth or other technology.

In one embodiment if a user is having trouble finding the ATM, if within range, they may push a button in their device/application and the LCD will flash colors or provide some other stimulus to alert the user where the ATM is (sounds, lights, etc.). In one embodiment an IEMI scanner may be required within the settings of an individual phone through the phone's SDK and may scan for additional items and wearables that are typically paired to the user.

In connection with the ATM, according to one embodiment of the invention, users may be provided with a debit, prepaid and/or credit card. The card may be equipped with any of the following but not limited to: Bluetooth chip or antenna, Wi-Fi chip or antenna, NFC, Europay MasterCard Visa ("EMV") or bank identification number ("Bin") strip to further secure and enhance the card and the user's ability to use the card with the ATM. As will be appreciated by one of ordinary skill in the art, the card may also include other known or future developed security enhancements. In one example, the Bluetooth or Wi-Fi chip/antenna in the user's card may be integrated with the user's mobile application or device. Software installed on the device or within the application may force the pairing of the device (e.g., phone, tablet) and the debit card to ensure that the card and the device are always in a certain proximity to each other. This may alert the user if the card or phone are separated (e.g., stolen or lost). In one embodiment, the card may also be deactivated or "shut off" at a user's request through the mobile application. These features may also be enabled or disabled by the user.

In one embodiment, the user may select and pre-set geographical boundaries or "geofences" like "home", "work" or certain areas (e.g., towns or cities) where the card will work whether or not it is paired with the user device at the time of purchase while establishing other locations where the card will only work if it is paired. This will for example prevent a stolen or lost card from being used, while enabling a user to use the card even if he or she left their device at their home.

When using the card at an ATM, the Bluetooth or Wi-Fi technology may also be used to provide additional security and pairing to ensure that the transaction is secure and being carried out by the user. In one embodiment if the ATM does not have the adequate features, the user may be alerted though their device and advised as to where other local ATMs which are more secure may be located.

In one embodiment, ATM 100 may dispense money without a user device using the combination of NFC (tap) or Bluetooth (connect) technologies, for example, to utilize the card to access the ATM in conjunction with or separate from a picture taken via LCD 10 as discussed above.

In one embodiment, the cards may include a small speaker so that it may be pinged or paged by the user through a computer or mobile device if it is lost or stolen. GPS tracking technology may also be incorporated in certain embodiments to locate or help pair the card.

As will be appreciated, any combination of verifications may be used to confirm the transaction depending on what devices the user has in their possession and what capabilities the ATM being used has. Where transactions involve more than one user, additional pairing of devices may be used to ensure the secureness of the transaction (e.g., wire transfers, transferring deed of a car/vehicle/vessel).

In one embodiment, the features of the card may also be used separate from the ATM. For example, if two card users have a meal at a restaurant together and one user uses their card, the application may be programmed to remind the user at a later time that they were with the other user and for example inquire if the user needs to split the cost. Alternatively the paying user may be prompted at the time of payment if they want to split the transaction with the other user. Additionally, the other user(s) may be prompted if they want to split the transaction which may be done in a seamless manner without complicated calculations.

In order to enhance the physical security of the ATM, in one embodiment, certain layers may be fortified and a lamination process utilized to prevent drilling of holes or injecting flammable gasses within the ATM to breach the device. Additional security may be employed to prevent cutting, for example of glass, or other maliciously intrusive actions. Similarly, special multi locking mechanisms may be utilized to prevent prying into the ATM using crowbars, wedges, or other picking devices that are typically used to burglarize or break down defenses or parts. These locks may be technologically improved using heretofore or future developed Bluetooth, passcode, scanner or other related technologies. In one embodiment, the ATM is made primarily of see-through material, such as glass, and placed in a protective envelope with a clear, transparent and lightweight appearance that is designed to withstand physical, forced entry. Additional security actions may be taken to improve the resistance for impact, cutting and blow torch entry. For example, one approach is to increase the time needed to create a gap in the exterior case large enough to extract money or the money container. As shown in FIG. 4, this may be accomplished by placing one or more layers of glass 411, 413, 414, 416, 434, 435 in a stepped configuration, and/or one or more layers 414, 416, 422 may be placed in a slot 403 that is processed with high-strength silicone, and/or by utilizing a multilayer laminated glass or a SPALLSHIELD® foil that is laminated on the inner side of the glass. For example, one or more layers may have a greater 411, 413, 414, 416, 421, 422 width or height than one or more other layers 434, 435, and/or one or more layers 434 may be separated from one or more other layers 435 by a distance of empty or filled space 402. Another approach is to place one or more inner-layers 421, 422 between layers of see-through material 411, 413, 414, 416. In one embodiment an inner-layer is composed of a material having a tear strength and rigidity that are each multiple times greater than polyvinyl butyral, for example a substantially transparent polymer composition. An exterior case of multiple layers of translucent material with one or more such inner-layers in between is significantly more resistant to forced entry, such as drilling, cutting and impacts, than conventional ATM materials.

In order to enhance the security of the network that the ATM uses, Secure Sockets Layer ("SSL") or other encryption related technology to try and prevent hacking of the ATM through other means. Additional security safeguards may include utilizing hashes or dynamically rotating credentials that will change with each transaction and are only usable for single payment. Microwave sensors may also be utilized in conjunction with known business hours to define lockdown mode and/or disable the ATM or certain features thereof.

The ATM may also include sensors that provide early warning intrusion alerts related to temperature, vibration, light and power for example and automatically lock or shut down the ATM. Moreover a distress, panic or SOS button may be included to notify authorities with one button and activate all optical components to record and capture all data possible including mac addresses, Bluetooth addresses, and other information relevant to the incident.

It should be noted that although the embodiments described may use multiple software modules for performing the various functions of the ATM or overall system, other embodiments could be implemented using any number of modules, with any single module incorporating the functions of several, or all, of the modules. The precise design of the software and the programming language used may be designed differently within the scope of the present invention. The software modules may be created using art recognized programming languages, including but not limited to C++, ASP, Java, C#, ASP.NET, or PHP or any combination of known or later developed programming languages that allow the functionality described.

Generally, the software functions of the described embodiments may be programmed via application software, system software or any combination thereof, and may be executable on one or more hardware components within the system, external to the system or some combination thereof. In some embodiments, system and/or application level software may reside on system hardware, various external client computer systems, including mobile devices or some combination thereof. Similarly, the implementation of various software functions described herein may at times overlap. Accordingly, the present invention should not be limited to the precise systems architecture described, but should be understood to include those variations as would be understood by a person of ordinary skill in the art having the benefits of the present disclosure.

It will also be understood that, although the various embodiments of the present invention described herein are being described in terms of certain server architecture, a thin client, fat client, or peer-to-peer type arrangement could be substituted for the system architecture described herein and are within the scope of the present invention. Additionally, the programming described herein may be stored in a machine readable form on a computer readable medium, such as a CD-ROM, DVD or USB and distributed to users for installation on user computers or devices. Alternatively, such programming may be downloaded via a network. In either embodiment, communication with the system may be effected across known networks, such as the Internet.

It should be noted that references herein to phrases such as "one embodiment" or "an embodiment" mean that a particular feature, structure or characteristic described in connection with the embodiment is included in one or more embodiment of the invention. The phrases such as "in one embodiment" or "in certain embodiments" in various places in the specification are not necessarily, but may be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the figures are purely illustrative, and that the system may be implemented in any number of ways, by the actual designers, as long as the functionality as described above, stays intact.

While there have been shown and described fundamental novel features of the invention as applied to the exemplary embodiments thereof, it will be understood that omissions and substitutions and changes in the form and details of the disclosed invention may be made by those skilled in the art without departing from the broad inventive concept thereof. It is understood, therefore, that this invention is not limited to the particular embodiments disclosed, but it is intended to cover modifications within the spirit and scope of the present invention. Therefore, the appended claims are intended to cover conventionally known, future developed variations and modifications to the components described herein as would be understood by those skilled in the art.

We claim:

1. A method for securely authenticating and enabling a financial transaction at an automated teller machine, the method comprising the steps of:
   receiving at a central computer system, from at least a portion of a software platform, planned transaction data representing a future financial transaction, the planned transaction data including transaction identification data;
   receiving at the central computer system a first set of electronic data from the automated teller machine, the first set of electronic data representing a request for at least first verification information;
   after receiving the first set of electronic data, the central computer system generating first verification information;
   sending from the central computer system a second set of electronic data to the automated teller machine, the second set of electronic data including at least the first verification information;
   receiving at the central computer system, from a wireless communication component of a user device, a third set of electronic data obtained through a short range interface of the automated teller machine that provides an audio QR code or visual QR code;
   conducting at the central computer system a first comparison by comparing at least a portion of the third set of electronic data to at least a portion of the second set of electronic data;
   if the first comparison results in a positive verification, the central computer system sending a fourth set of electronic data to the user device, the fourth set of electronic data including at least second verification information;
   receiving at the central computer system a fifth set of electronic data from the automated teller machine;
   conducting at the central computer system a second comparison comprising comparing at least a portion of the fifth set of electronic data to at least a portion of the fourth set of electronic data;
   if the second comparison results in a positive verification, sending from the central computer system a sixth set of electronic data to the automated teller machine, the sixth set of electronic data including instructions for the automated teller machine to execute the planned financial transaction; and
   the automated teller machine executing the planned financial transaction.

2. The method claim 1, wherein the first verification information comprises unique information that is not repeated by the central computer system during later financial transactions.

3. The method of claim 1, wherein the second verification information is generated by the central computer system after determining the second comparison resulted in a positive confirmation.

4. The method of claim 1, wherein the second verification information comprises unique information that is not repeated by the central computer system during later financial transactions.

5. The method of claim 1, wherein the first verification information comprises one or more of: visual information, audible information, and electronic data.

6. The method of claim 1, wherein the second verification information comprising one or more of: visual information, audible information, and electronic data.

7. The method of claim 1, wherein the third electronic data set further comprises additional verification information, the additional verification information comprising one or more of:
   user-generated verification information;
   GPS information;
   user biometric information; and
   transaction identification information.

8. The method of claim 1, wherein the fifth electronic data set further comprises additional verification information, the additional verification information comprising one or more of:
   ATM captured verification information;
   user device information;
   GPS information;
   user biometric information;
   facial recognition information; and
   transaction identification information.

9. The method of claim 1, wherein the planned transaction data associates the future financial transaction with a user account and with one or more automated teller machine.

10. A method for securely enabling a financial transaction at an automated teller machine, the method comprising the steps of:
    a user submitting a future financial transaction within at least a portion of a software platform;
    sending planned transaction data representing the planned financial transaction to a central computer system, the planned transaction data associating the future financial transaction with the user and with one or more automated teller machine, the planned transaction data including transaction identification data;
    the user interacting with the one or more automated teller machine;
    in response to the user interaction, the automated teller machine sending to the central computer system a first set of electronic data, the first set of electronic data representing a request for at least first verification information;
    after receiving the first set of electronic data, the central computer system generating first verification information;
    sending from the central computer system a second set of electronic data to the automated teller machine, the second set of electronic data including at least the first verification information;
    after receiving the second set of electronic data, the automated teller machine providing the user with the first verification information through a short range interface of the automated teller machine that provides an audio QR Code or visual QR code;
    the user sending from a user device, via a wireless communication component of the user device, a third set of electronic data to the central computer system;
    after receiving the third set of electronic data, the central computer system conducting a first comparison by comparing at least a portion of the third set of electronic data to at least a portion of the second set of electronic data;
    if the first comparison results in a positive verification, the central computer system sending a fourth set of electronic data to the user device, the fourth set of electronic data including at least second verification information;

after the user device receives the fourth set of electronic data, the user providing the automated teller machine with the second verification information;

the automated teller machine sending a fifth set of electronic data to the central computer system;

after receiving the fifth set of electronic data, the central computer system conducting a second comparison comprising comparing at least a portion of the fifth set of electronic data to at least a portion of the fourth set of electronic data;

if the second comparison results in a positive verification, the central computer system sending a sixth set of electronic data to the automated teller machine, the sixth set of electronic data including instructions for the automated teller machine to execute the planned financial transaction; and the automated teller machine executing the planned financial transaction.

11. The method of claim 10, wherein the user interacts with the automated teller machine by one or more of:

the user physically interacts with a user input device of the automated teller machine;

the user verbally interacts with the automated teller machine;

the user visually interacts with the automated teller machine;

the user device wirelessly sending electronic data to the automated teller machine;

the user device emitting audio within proximity of the automated teller machine; and the user device displaying information within proximity of the automated teller machine.

12. The method claim 10, wherein the automated teller machine provides the user with information representing the first verification information by one or more of:

visually transmitting the first verification information via a display of the automated teller machine;

audibly transmitting the first verification information by generating audio; and electronically transmitting the first verification information wirelessly to a user device of the user.

13. The method of claim 10, wherein the user provides the automated teller machine with information representing the second verification information by one or more of:

physically interacting with a user input device of the automated teller machine;

visually transmitting the second verification information to an optical device of the automated teller machine;

audibly transmitting the second verification information to a listening device of the automated teller machine; and electronically transmitting the second verification information wirelessly to the automated teller machine from a user device.

14. The method of claim 10, wherein one or more of the first verification information and the second verification information comprises unique information that is not repeated by the central computer system during later financial transactions.

15. The method of claim 10, wherein one or more of the first verification information and the second verification information comprises one or more of: visual information, audible information, and electronic data.

* * * * *